June 24, 1941. D. C. DRILL 2,246,844
APPARATUS FOR SEPARATING PRODUCTS FROM MINERAL WOOL BLOW CHAMBER
Filed Sept. 30, 1937 4 Sheets-Sheet 2

Daniel C. Drill
INVENTOR
BY Carlton C. Davis
ATTORNEY

Daniel C. Drill
INVENTOR

June 24, 1941.　　　　D. C. DRILL　　　　2,246,844
APPARATUS FOR SEPARATING PRODUCTS FROM MINERAL WOOL BLOW CHAMBER
Filed Sept. 30, 1937　　　4 Sheets-Sheet 4

Daniel C. Drill
INVENTOR

BY
ATTORNEY

Patented June 24, 1941

2,246,844

UNITED STATES PATENT OFFICE 2,246,844

APPARATUS FOR SEPARATING PRODUCTS FROM MINERAL WOOL BLOW CHAMBERS

Daniel C. Drill, Wabash, Ind., assignor to American Rock Wool Corporation, Wabash, Ind., a corporation of Indiana Application September 30, 1937, Serial No. 166,700

4 Claims. (Cl. 183—34)

This invention relates generally to improvements in apparatus for the manufacture of mineral wool, and more particularly to apparatus associated with a blow chamber utilized in the production of mineral wool, for separating mineral wool fibers from gases exhausted from the blow chamber.

An object of the present invention is to provide an improved and novel apparatus associated with a blow chamber utilized in the production of mineral wool, for recovering mineral wool fibers from gases exhausted from the blow chamber.

A further object of the present invention is to provide an improved and novel apparatus associated with a blow chamber utilized in the production of mineral wool, for separating mineral wool fibers from gases exhausted from the blow chamber, and for returning the mineral wool fibers recovered from the exhaust gases to the blow chamber for incorporation in the mineral wool product.

Another object of the present invention is to provide an improved and novel apparatus associated with a blow chamber, for separating mineral wool fibers from gases exhausted from the blow chamber, and which will operate with efficiency during continuous service without being affected by adhesive tendencies of the mineral wool fibers.

A further object of the present invention is to provide an improved and novel apparatus associated with a blow chamber utilized in the production of mineral wool, for separating and recovering volatilized liquids from gases exhausted from the blow chamber.

Another object of the present invention is to provide an improved and novel apparatus associated with a blow chamber for accomplishing the above objectives, which is simple in construction, positive in operation, and readily adaptable for use under various conditions of service.

Other objects and advantages will be apparent from the following description.

In the drawings illustrating a preferred embodiment of the invention:

Figure 1:
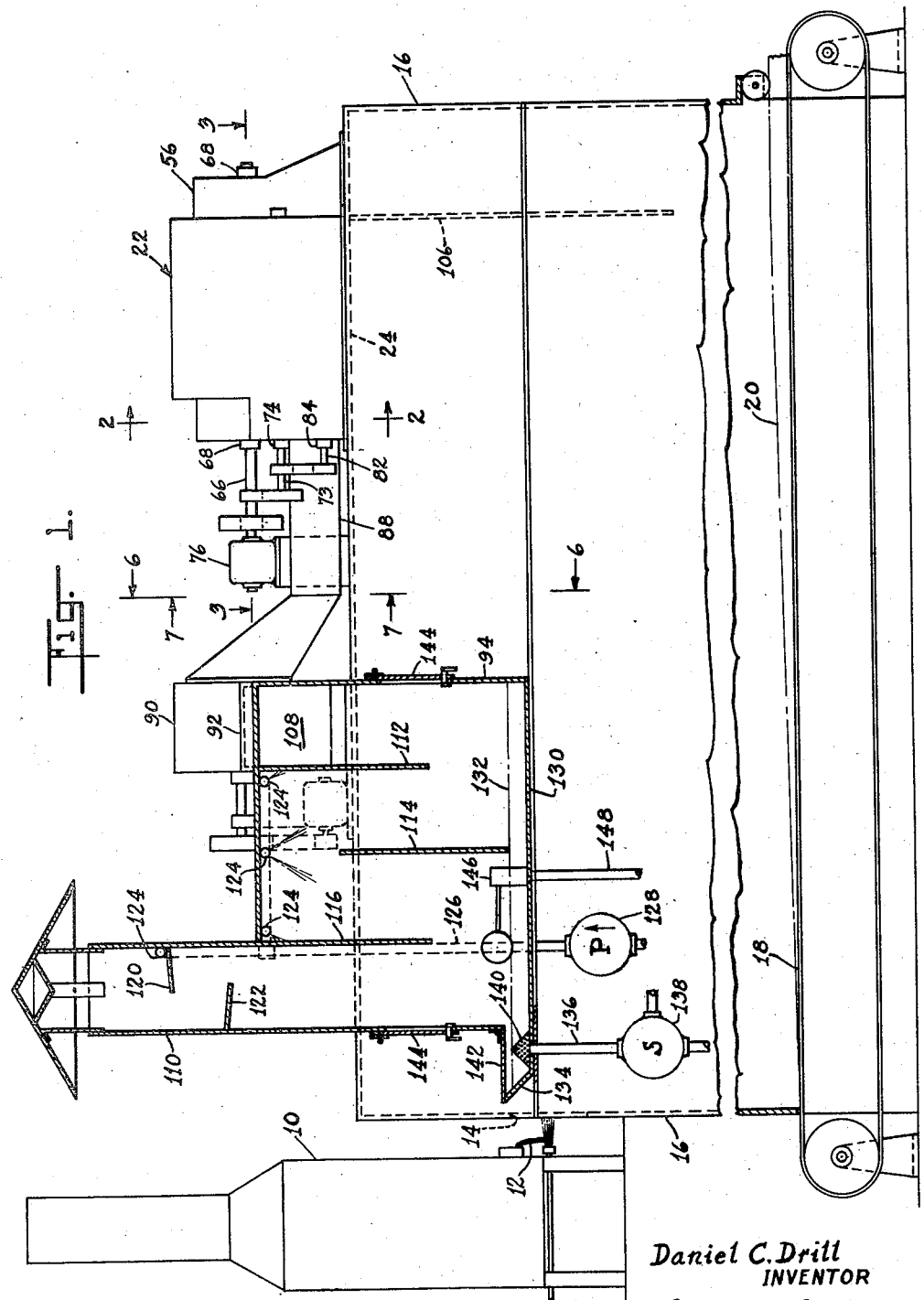
Figure 1 is a side elevation, partly in section, of an apparatus for manufacturing mineral wool, showing the present invention as associated therewith.
Figure 3:
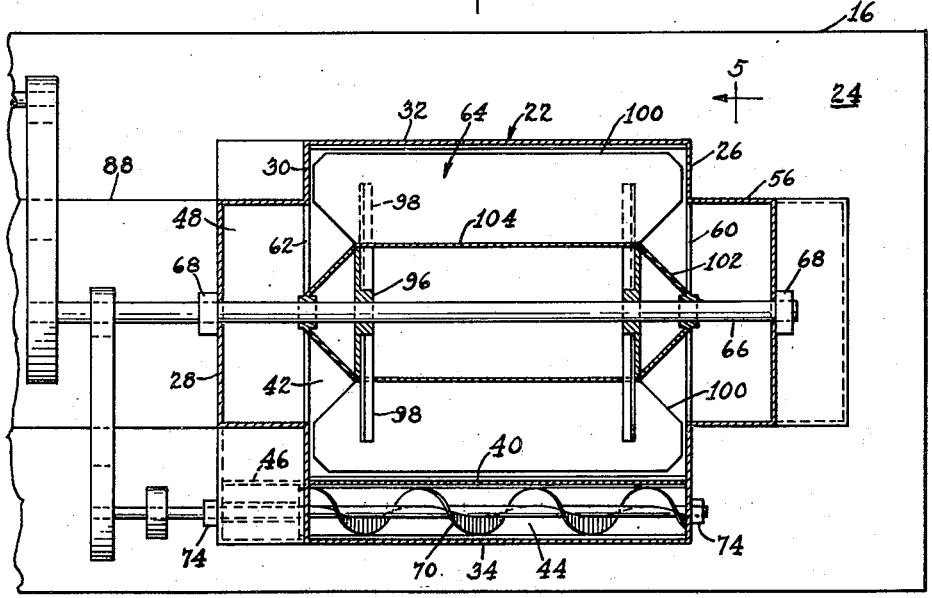
Figure 3 is a horizontal sectional view taken substantially along the line 3—3 of Figure 1.
Figure 4:
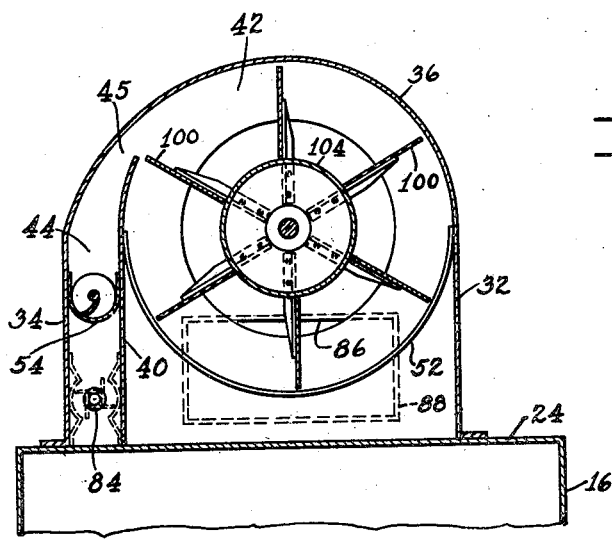
Figure 5:
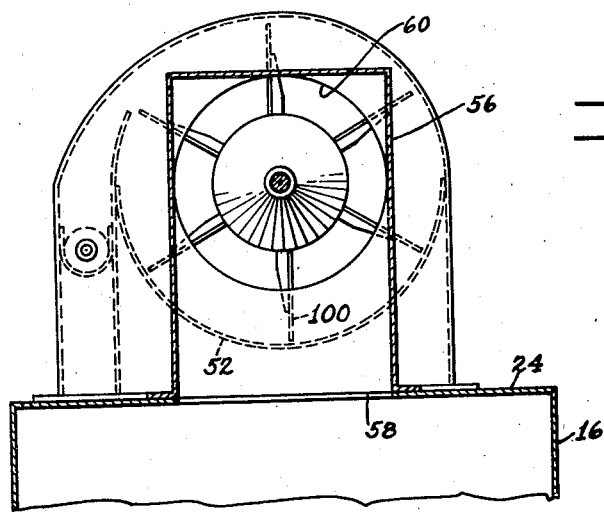
Figure 6:
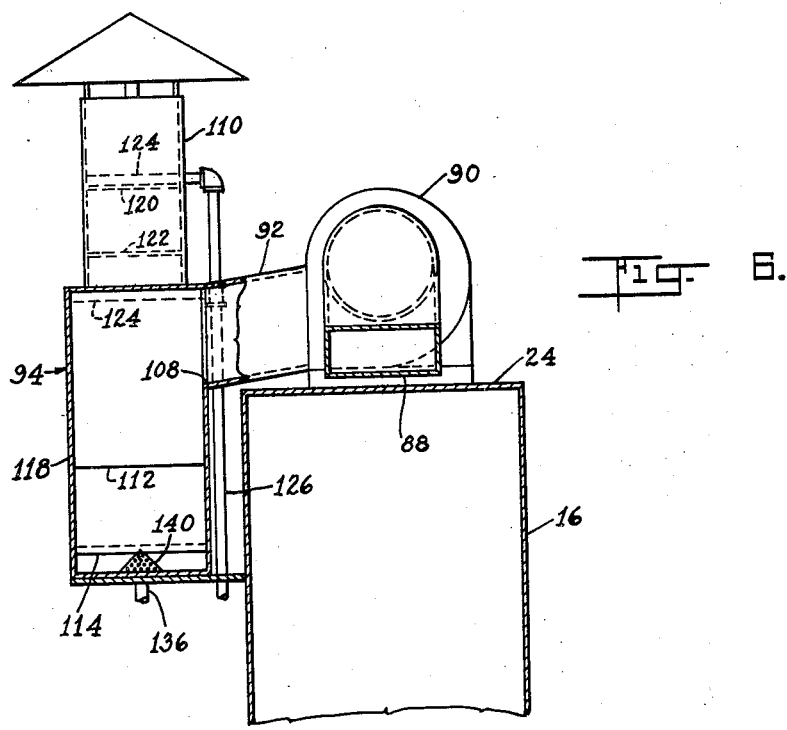
Figure 7:
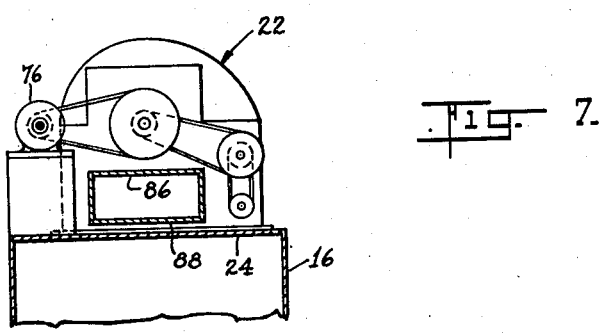

Figures 4 and 5 are vertical sectional views taken along the lines 4—4 and 5—5, respectively, of Figure 3; and Figures 6 and 7 are vertical sectional views taken substantially along the lines 6—6 and 7—7, respectively, of Figure 1.

In the manufacture of mineral wool, a furnace or cupola 10 is provided for melting suitable raw materials, such as rock or slag. The molten materials flow from the furnace in a liquid stream 12 which is subjected to a powerful jet or blast of air or steam for dividing or shredding the molten stream into light fine fibers known as mineral wool.

The jet of air or stream which divides the molten stream into the mineral wool fibers also hurls or injects the mineral wool fibers through an opening 14 in a blow chamber 16 which is positioned in front of and in relatively close proximity to the furnace 10.

This blow chamber, while it also serves as a settling chamber is not to be confused with the ordinary settling chamber as it is adapted to continuously receive the powerful blast of steam or air which discharges the more or less incandescent mineral wool fibers in suspension within the blow chamber. This blast of formation would, of course, generate a dangerously high pressure within the blow chamber were not means provided to continuously permit the injected gases or vapors to continuously pass through and readily escape from the blow chamber. The term "blow chamber" as used in this specification and its accompanying claims is limited to such a construction.

The mineral fibers float in the gases, comprising mostly steam which is injected into the chamber 16 with the fibers, and settles on a slowly moving conveyor 18 disposed in and providing the floor of the chamber. The accumulation of mineral fibers on the conveyor forms a layer of mineral wool felt 20 which is continuously removed from the chamber by the conveyor.

In order to prevent the gases from accumulating in the blow chamber or escaping through the entrance opening therein, it is the general practice to provide the chamber with an exit or vent opening through which the gases may escape or be exhausted to the atmosphere. The provision of a simple vent opening through which the gases from the chamber may escape to the atmosphere, however, presents serious disadvantages, the principal one of which is that a large proportion of the mineral wool fibers which are suspended or float in the gases in the chamber, are carried away to the atmosphere with the exhaust gases.

This loss of mineral fibers seriously impairs the efficiency of the apparatus for making the mineral wool, as it greatly reduces the amount of mineral wool produced in proportion to the amount of raw materials employed.

The loss of fibers to the atmosphere resulting from the employment of a simple exhaust vent also presents a serious nuisance problem as the mineral fibers, usually in bunches or clusters, are scattered over the locality in which the mineral wool plant is situated.

Numerous attempts have been made to separate and recover the mineral wool fibers from the gases exhausted from the blow chamber, such as by the use of screening devices, but, as far as is known, all such attempts have met with failure or only moderate success, primarily because of the tendency of the fibers to adhere to anything which may retard or prevent movement of the fibers.

One of the primary objects of the present invention is to provide an apparatus for separating mineral wool fibers from the gases exhausted from a blow chamber which will not be affected by the adhering tendencies of the mineral fibers.

In the embodiment of the invention illustrated in the drawings, a housing 22 is provided which is mounted on the top side 24 of the blow chamber 16, as best shown in Figure 1.

The housing comprises end walls 26 and 28, and an intermediate wall 30 disposed in spaced relationship therebetween. The end walls and the intermediate wall are connected to side walls 32 and 34, and an arcuate shaped top wall 36 is provided for covering the space between the end wall 26 and the intermediate wall 30. A top wall 38 is also provided for covering the space between the intermediate wall 30 and the end wall 28, and is connected with said walls.

As shown in Figures 3 and 4, a partitioning wall 40 extends between the end wall 26 and the intermediate wall 30 for dividing the space between said walls into a rotor compartment 42 and a conveyor compartment 44. The wall 40 extends upwardly toward the top wall 36 of the housing and is spaced from said top wall for providing an opening 45 between the compartments 42 and 44.

A partitioning wall 46 is similarly positioned between the intermediate wall 30 and the end wall 28 for dividing the space between said walls into a gas outlet compartment 48 and a material outlet compartment 50, as best shown in Figures 3 and 4. The compartment 50 is in communication with the interior of the chamber 16 by means of an opening 51 in the top 24 of the chamber.

The rotor compartment 42 is provided with a semi-cylindrical bottom wall 52 extending between the end wall 26 and the intermediate wall 30, and the conveyor compartment 44 is likewise provided with an arcuate bottom wall 54 which, however, extends through the intermediate wall a short distance into the chamber 50.

As shown in Figures 1, 3, and 5, the housing 22 comprises in part an inlet pipe portion 56 which provides communication between an opening 58 in the top 24 of the blow chamber 16 and an opening 60 in the end wall 26 of the housing 22.

The intermediate wall 30 also has an opening 62 similar to and in alignment with the opening 60 in the end wall 26 for providing communication between the rotor compartment 42 and the gas outlet compartment 50.

Figure 2:
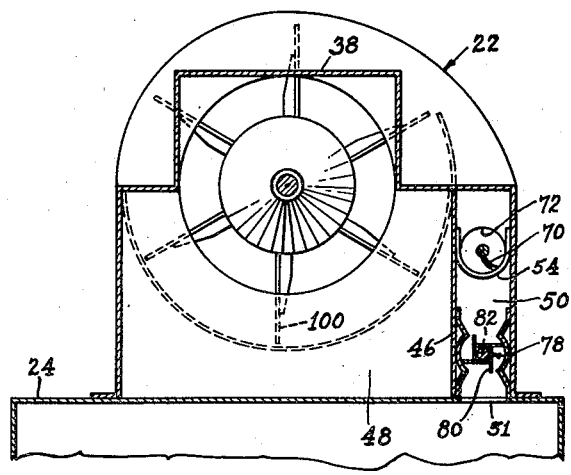
Figure 2 is a vertical sectional view taken substantially along the line 2—2 of Figure 1.

A rotor wheel 64 is disposed in the rotor compartment 42 within the housing 22, and is fixedly mounted on a shaft 66 which in turn is mounted in bearing members 68 carried by the housing 22. As shown in Figures 2, 3, and 4, a screw conveyor 70 is disposed in the conveyor compartment 44 and extends through an opening 72 in the intermediate wall 30 into the material outlet compartment 50. The screw conveyor comprises in part a shaft 73 which is mounted in bearings 74 carried by the housing 22, and is operatively connected to the rotor shaft 66 which in turn is driven by a motor 76.

A rotary paddle wheel 78 is disposed in the material outlet compartment 50 between the screw conveyor 70 and the outlet opening 51 in the top of the blow chamber 16, as shown in Figure 2. The rotary paddle wheel comprises blades 80 connected with a square section of a shaft 82 which is mounted in bearing members 84 carried by the housing 22, and is driven by being operatively connected to the screw conveyor shaft 73, as shown in Figure 7.

As best shown in Figures 1, 6, and 7, the end wall 28 of the housing 22 is provided with an outlet opening 86 in communication with a duct or pipe 88 which has one end connected with the end wall 28 of the housing and the other end connected with an exhaust fan 90 at the intake opening thereof. A pipe or duct 92 is also provided which has one end connected with the exhaust fan at the outlet opening thereof and the other end in communication with an auxiliary housing 94 hereinafter described.

The rotor wheel 64 referred to hereinbefore as being disposed in the compartment 42 comprises hub members 96 fixedly mounted on the shaft 66 and provided with radially extending arms 98 fixedly connected therewith. A plurality of rotor blades 100 is fixedly connected to the arms 98 in any suitable manner and is rotated by the shaft 66 within the compartment 42.

Conical shaped end members 102 are disposed on the shaft 66 at the outer sides of the hub members 96 for decreasing the resistance to and guiding the gases which flow through the openings 60 and 62 and the compartment 42.

As shown in Figures 3 and 4, a cylindrical shell 104 is connected with the hub members at the outer sides thereof for enclosing the spaces within the confines of the peripheries of the hub members 96 and the conical end members 102, and is provided with openings therein through which the arms 98 extend, whereby gases flowing through the compartment 42 must pass between the rotor blades 100.

The operation of the structure hereinbefore described will be readily understood.

The suction fan 90 pulls or exhausts the gases from the blow chamber 16 through the opening 58 in the top 24 of the blow chamber. It will be noted that a baffle wall 106 is disposed in the blow chamber 16 and extends between the sides thereof. The baffle wall 106 is positioned between the exhaust opening 58 in the top of the chamber and the entrance opening 14 in the end of the chamber, and has the lower edge thereof spaced a sufficient distance from the conveyor 18 so that the gases in the blow chamber 16 flowing to the outlet opening 58 must pass beneath the baffle wall. This construction causes the major portion of the mineral wall fibers suspended in the gases in the blow chamber 16 to settle on the conveyor 18 prior to the withdrawal of the gases from the chamber, and reduces to a minimum the mineral wool fibers which are withdrawn with the gases.

The suction fan 90 pulls or exhausts the gases from the blow chamber 16 through the opening 58 in the top 24 of the blow chamber 16. The gases pass through the pipe 56 and the opening 60 of the housing 22 into the rotor chamber 42.

When the gases and the mineral wool fibers carried thereby enter the rotor compartment 42, the blades 106 of the rapidly revolving rotor wheel 64 rotating in a counter-clockwise direction as viewed in Figure 4, hurl the mineral fibers by centrifugal force through the opening 45 and into the conveyor chamber 44.

The mineral wool entering the conveyor chamber 44 is carried by the screw conveyor 70 through the opening 72 in the intermediate wall 30 of the housing, and is deposited in the outlet compartment 50 from which the mineral wool is returned to the blow chamber 16 through the opening 51 in the top of the blow chamber by the revolving paddle wheel 78. The mineral wool thus returned to the blow chamber may then drop onto the conveyor 18 and become a part of the mineral wool felt 20.

It will be noted that the above structure prevents the gases in the blow chamber 16 from being exhausted through the opening 51, and also prevents the gases in the rotor compartment 42 from returning to the blow chamber.

The gases in the rotor compartment 42 are continuously withdrawn by the fan 90 through the opening 62, the compartment 46, and the duct 88, to the fan from which the gases are discharged through the pipe 92 to the housing 94.

The gases passing through the duct 88 after having been subjected to the centrifugal action of the rotor wheel 64 may contain particles in the form of dust or very short fibers and other substances, such as solvents in a volatilized state, which have been constituents of materials applied to the fibers for imparting certain characteristics to the mineral wool felt disposed on the conveyor.

It may be desired that these solid particles and volatilized substances be removed from the exhaust gases prior to the release of the gases to the atmosphere, and it is for this purpose that the auxiliary housing 94 is provided.

The housing 94, as best shown in Figures 1 and 6, has an inlet opening 108 at one end in communication with the pipe 92 from the exhaust fan 90, and may be provided with a vent duct 110 at the other end.

A plurality of baffle walls 112, 114, and 116, is positioned between the side walls 118 of the housing 94 and is arranged so that the gases passing through the housing must flow under the baffle walls 112 and 116 and over the baffle wall 114. The housing 94 also may be provided with spaced baffle plates 120, and 122, within the vent duct 110.

Spray pipes 124 are disposed within the housing 94 and the vent duct 110, and are connected to a supply pipe 126 which in turn may be connected to a pump 128 for forcing a liquid, preferably water, into the spray pipes.

The water is sprayed from the spray pipes within the housing 94 and tends to collect all of the solid particles, and dissolve or condense all of the volatilized gases carried by the exhaust gases passing through the housing. The gases, in flowing through the housing 94, pass under the baffle walls 112 and 116 and over the baffle wall 114, as well as around the ends of the baffle plates 120 and 122 in the vent duct 110. The spray pipes 124 nearest the baffle walls 112 and 116 and the baffle plate 120, provide a water shed from the ends of these baffles, which serves to effectively collect the particles carried by the exhaust gases and also cools the gases to such an extent that the volatilized substances carried by the gases are condensed and remain in the housing.

The exhaust gases, after being washed by the sprays, escape through the vent duct 110 to the atmosphere.

The housing 94 has a bottom portion 130 thereof adapted for serving as a reservoir for liquids, and for receiving the condensate of the volatile substances.

The bottom portion 130 of the housing 94 may be extended beyond an end wall thereof, as at 134, and may be provided with an outlet conduit 136 for withdrawing the water and condensates from the housing. The conduit 136 may be connected with a mechanical or filter separator illustrated diagrammatically at 138 for separating the water from the condensates withdrawn from the housing 94.

A strainer 140 is provided for over the entrance opening to the conduit 136 for preventing solid matter from entering the separator 138, and the housing may be provided with an opening covered by a door 142 whereby access may be had to the chamber for removing solid matter which accumulates about the strainer. The housing 94 may also be provided with openings covered by doors 144 whereby access may be had to the housing for periodically removing any silt deposited in the housing as a result of the solid particles removed from the exhaust gases.

A float valve 146 may be disposed in the housing and be connected to a pipe 148 which in turn may be in communication with a water supply source for maintaining the liquids in the reservoir at a given level.

Should the condensation resulting from the exhaust gases be more than sufficient to maintain the liquids in the reservoir at the desired level, then the float valve 146 may be adapted to supplement the outlet pipe 136 for releasing the surplus liquids in the housing, and the pipe 148 may be connected with a separator 138 instead of being connected with a water source of supply. If so desired, a valve may be provided for regulating the supply of water to the housing and another valve may be provided for regulating the release of the surplus liquids in the reservoir.

It will be noted that the fan 90 for exhausting the gases from the blow chamber 16 and forcing the gases through the housings 22 and 94 may also be positioned between the outlet opening 58 in the blow chamber 16 and the housing 22, and the pipe 88 may be connected directly with the housing 94, or the fan 90 may be positioned with the outlet opening of the housing 94 in communication with the inlet port of the fan and the outlet duct 92 of the fan in communication with the atmosphere.

Thus it will be observed from the preceding description that an apparatus is provided which accomplishes the objectives hereinabove set forth.

Modifications and changes may be made without departing from the spirit of the invention and it is intended that this invention shall be limited only by the scope of the appended claims.

I claim:

1. In apparatus of the character described, an elongated mineral wool blow chamber having side, front, rear, top, and base enclosure portions, an inlet opening in said rear enclosure portion to receive a commingled blast of gaseous fluid and newly formed mineral wool fibers, a baffle athwart the interior of said chamber extending to said side and top enclosure portions and spaced near to but apart from said front and base enclosure portions and a gaseous fluid outlet in front of said baffle through which said gaseous fluid may pass out of said chamber, a separator fan outside said chamber, a housing enclosing said fan, a conduit connected to said housing and to said gaseous fluid outlet to receive said gaseous fluid and the mineral wool in gaseous suspension from said chamber, a mineral wool discharge conduit connecting said housing with said blow chamber and communicating with said chamber through the top thereof to the rear of said baffle for discharging mineral wool from said housing into said blow chamber, said housing being also provided with a gaseous fluid discharge outlet through which said fluid may pass out of said housing.

2. In apparatus of the character described, an elongated mineral wool blow chamber having side, front, rear, top, and base enclosure portions, an inlet opening in said rear enclosure portion to receive a commingled blast of gaseous fluid and newly formed mineral wool fibers, a baffle athwart the interior of said chamber extending to said side and top enclosure portions and spaced near to but apart from said front and base enclosure portions and a gaseous fluid outlet in front of said baffle through which said gaseous fluid may pass out of said chamber, a separator fan outside said chamber, a housing enclosing said fan, a conduit connected to said housing and to said gaseous fluid outlet to receive said gaseous fluid and the mineral wool in gaseous suspension from said chamber, a mineral wool discharge conduit connecting said housing with said blow chamber and communicating with said chamber through the top thereof to the rear of said baffle for discharging mineral wool from said housing into said blow chamber, a conveyor for receiving the separated mineral wool from said fan and discharging said separated wool into said mineral wool discharge conduit, a rotor valve means in said mineral wool discharge conduit positioned beneath said conveyor at one end thereof for receiving the discharged mineral wool and means for rotating said conveyor and rotor valve means, said housing being also provided with a gaseous fluid discharge outlet through which said fluid may pass out of said housing, said rotor valve means having a plurality of radially extending blades for dividing the mineral wool in said discharge conduit into separated bunches or portions and moving said bunches or portions toward said chamber.

3. In apparatus of the character described, an elongated mineral wool blow chamber having side, front, rear, top, and base enclosure portions, an inlet opening in said rear enclosure portion to receive a commingled blast of gaseous fluid and newly formed mineral wool fibers, a baffle athwart the interior of said chamber extending to said side and top enclosure portions and spaced near to but apart from said front and base enclosure portions, a gaseous fluid outlet in front of said baffle through which said gaseous fluid may pass out of said chamber, a separator fan outside said chamber, a housing enclosing said fan, a conduit connected to said housing and to said gaseous fluid outlet to receive said gaseous fluid and the mineral wool in gaseous suspension from said chamber, a mineral wool discharge conduit connecting said housing with said blow chamber and communicating with said chamber through the top thereof to the rear of said baffle for discharging mineral wool from said housing into said blow chamber, said housing being also provided with a gaseous fluid discharge outlet through which said fluid may pass out of said housing, said base enclosure portion including a movable conveyor beneath said baffle and adapted to receive said fibers as they fall from said blast and said mineral wool discharge conduit and convey said fibers beneath said baffle and out of said chamber.

4. In the apparatus of the character described, an elongated mineral wool blow chamber having side, front, rear, top, and base enclosure portions, an inlet opening in said rear enclosure portion to receive a commingled blast of gaseous fluid and newly formed mineral wool fibers, a baffle athwart the interior of said chamber extending to said side and top enclosure portions and spaced near to but apart from said front and base enclosure portions, a gaseous fluid outlet in front of said baffle through which said gaseous fluid may pass out of said chamber, a separator fan outside said chamber, a housing enclosing said fan, a conduit connected to said housing and to said gaseous fluid outlet to receive said gaseous fluid and the mineral wool in gaseous suspension from said chamber, a mineral wool discharge conduit connecting said housing with said blow chamber and communicating with said chamber through the top thereof to the rear of said baffle for discharging mineral wool from said housing into said blow chamber, a conveyor for receiving the separated wool from said fan and discharging said separated wool into said mineral wool discharge conduit, a rotor valve means in said mineral wool discharge conduit positioned beneath said conveyor at one end thereof for receiving the discharged mineral wool and means for rotating said conveyor and rotor valve means, said base enclosure portion including a movable conveyor beneath said baffle and adapted to receive said fibers as they fall from said blast and said mineral wool discharge conduit and convey said fibers beneath said baffle and out of said blow chamber, said housing being also provided with a gaseous fluid discharge outlet through which said fluid may pass out of said housing, said rotor valve means having a plurality of radially extending blades for dividing the mineral wool in said discharge conduit into separated bunches or portions and moving said bunches toward said chamber.

DANIEL C. DRILL.